Nov. 4, 1924.
W. G. KIFER
1,513,999
ROLLER BEARING CAGE
Filed March 1, 1923
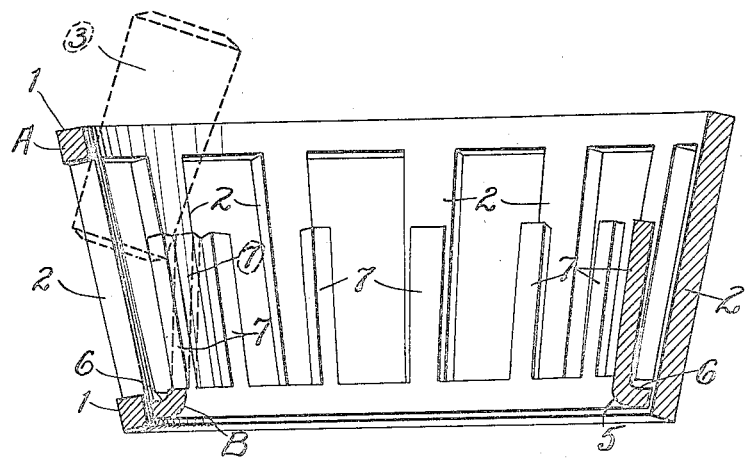
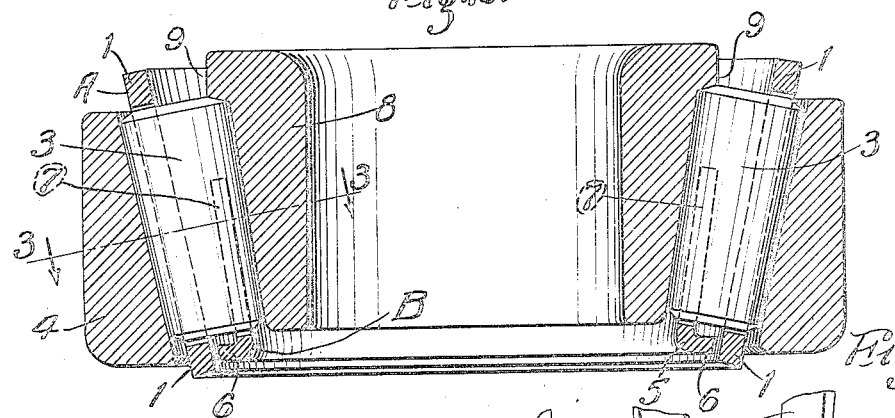
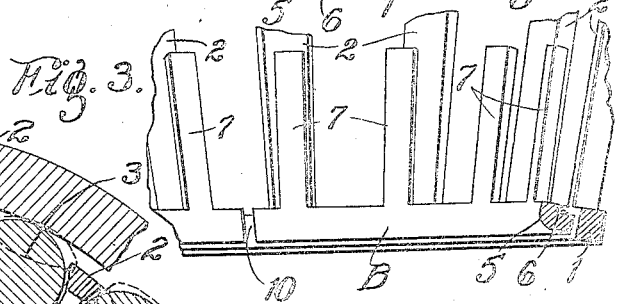
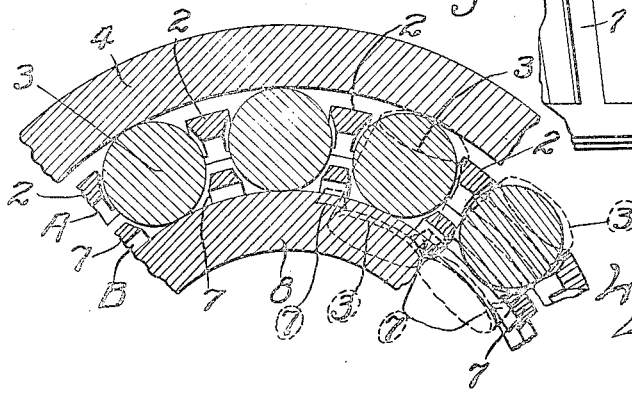
INVENTOR:
Ward G. Kifer,
by Emmett Owen
his ATTORNEYS.

Patented Nov. 4, 1924.

1,513,999

UNITED STATES PATENT OFFICE.

WARD G. KIFER, OF CANTON, OHIO, ASSIGNOR TO THE TIMKEN ROLLER BEARING COMPANY, OF CANTON, OHIO, A CORPORATION OF OHIO.

ROLLER-BEARING CAGE.

Application filed March 1, 1923. Serial No. 622,008.

*To all whom it may concern:*

Be it known that I, WARD G. KIFER, a citizen of the United States, and a resident of the city of Canton, in the county of Stark and State of Ohio, have invented a new and useful Improvement in Roller-Bearing Cages, of which the following is a specification.

My invention relates to cages for roller bearings and the like and has for its principal object to devise a cage which with the rollers will form a self-contained unit removable from the cup and cone of the bearing.

The invention consists in the cage and in the parts and combinations of parts hereinafter described and claimed.

In the accompanying drawing,

Fig. 1 is a longitudinal sectional view of a cage embodying my invention, the dotted lines indicating a roller being inserted into one of the pockets of the cage, Fig. 2 is a longitudinal sectional view of the assembled bearing, Fig. 3 is a cross-sectional view on the line 3—3 of Fig. 2, and Fig. 4 is a view similar to Fig. 1, showing a modified form of inner cage member.

The cage consists of an outer member A and an inner member B. The outer member A comprises annular end portions 1 connected by bridges 2, the spaces between the bridges constituting pockets adapted to receive the rollers 3 of a roller bearing. In the drawings, a bearing of the conical type is shown. The sides of the bridges 2 are shaped to fit the rollers 3, and to permit them to project beyond the cage so as to contact with the race-way of the cup 4 or outer bearing member. The pockets are small enough to prevent the rollers from passing completely therethrough.

The inner member B of the cage comprises an annular end member 5 disposed at the small end of the outer member and having a circumferential end flange 6 and conically disposed fingers 7. The fingers 7 are equal in number to the bridges 2 of the outer member A of the cage and the spaces between the fingers provide pockets corresponding to the pockets of the outer member and adapted to receive the rollers. The fingers are shorter than the bridges of the outer member. The rollers 3 are permitted to project beyond the inner periphery of the inner cage member to bear against the race-way of the cone 8, or inner bearing member of the bearing. The ends of the rollers are beveled to cooperate with the rib 9 at the larger end of the cone. The smaller end of the cone needs no rib.

The end flange 6 of the inner cage member B bears against the ends of the rollers 3, and thus prevents the inner member from moving in one direction. The outwardly flaring fingers 7 prevent the inner member from moving in the other direction. Thus, the rollers and the two members of the cage constitute a self-contained unit that may be removed from the bearing. As shown in Fig. 4, the inner cage member B may be split, as shown at 10, leaving a gap in the annular end portion 5 and flange 6. It is thus possible to make the member B from a flat strip.

The process of assembling rollers in the hereinbefore described cage is illustrated in dotted lines in Figs. 1 and 3. A roller is inserted in a pocket of the outer member of the cage and pressed downwardly into said pocket. The roller forces the fingers of the inner cage member to yield as indicated in dotted lines, thus permitting the roller to move into place. As soon as the end of the roller clears the annular end member of the outer cage member, the fingers spring back into place, and the roller is held in its pocket as indicated in Figs. 2 and 3. A plurality of rollers, or all of the rollers may be inserted at one time if desired.

It is common practice to provide the cones or inner bearing members with a rib at the small end, to hold the rollers and cage in place. According to the present invention this rib may be dispensed with, as shown in Fig. 2. This cheapens and simplifies the manufacture of cones and makes it easier to gage the accuracy of their size and shape. The cage and rollers may be removed from the bearing, or either the cup or cone may be removed. This makes it easier to inspect or repair any part and to replace a worn part. According to the present invention the rollers and cage are easily slipped on to the cone without danger of marring the surface of the rollers; whereas when the cone is provided with a rib at the small end, said rib frequently scratches and mars the rollers when the bearing is being assembled.

With my invention it is easy to remove and replace any roller without destroying the cage. The present invention makes it possible to instal the cone in place and then mount the rollers thereon, which is very advantageous in some cases. Cages now commonly used have to be spread in order to permit installing of the bearing and then the spread cage must be straightened or closed in. These operations are expensive and difficult and frequently result in the bridges being distorted or in a cage being broken. A practical advantage is that a given cage and rollers may be used with a variety of cones, the race-way of all of said varieties being the same, but the over all length or other features of construction of the cone being different. According to the present invention it it not necessary to have a set of rollers and a cage assembled on every cone, but a comparatively small supply of roller and cage units may be kept in stock, and used with any desired type of cone. If the inner member B is split, the process of making it is simplified and the cost reduced, and the necessity for accurate work is reduced.

Obviously numerous changes may be made without departing from the invention and I do not wish to be limited to the precise construction shown.

What I claim is:

1. A cage for conical roller bearings comprising outer and inner members said outer member comprising annular end members connected by bridges and said inner member comprising an annular end member and conically disposed fingers corresponding to the bridges of said outer member and cooperating therewith to form pockets for the rollers.

2. A cage for conical roller bearings comprising outer and inner members said outer member comprising annular end members connected by bridges and said inner member comprising a split annular end member and conically disposed fingers corresponding to the bridges of said outer member and cooperating therewith to form pockets for the rollers.

3. A cage for conical roller bearings comprising outer and inner members, said outer member comprising annular end members and bridges connecting them and said inner member comprising an annular end member having a circumferential flange overlapping the ends of the rollers and said annular end member having conically disposed fingers corresponding to the bridges of said outer member and cooperating therewith to form pockets for retaining the rollers.

4. A cage for conical roller bearings comprising conical outer and inner members, said outer member comprising annular end members and bridges connecting them and said inner member comprising an annular end member with conically disposed fingers corresponding to but shorter than the bridges of said outer member, and cooperating therewith to form pockets for the rollers.

5. A cage for conical roller bearings comprising conical outer and inner members, said outer member comprising annular end members and bridges connecting them and said inner member comprising an annular end member with conically disposed fingers corresponding to but shorter than the bridges of said outer member, and cooperating therewith to form pockets for the rollers and said annular end member also having a circumferential flange overlapping the ends of the rollers.

Signed at Canton, Ohio, this 24th day of February, 1923.

WARD G. KIFER.